A. CHURCHWARD.
ELECTRIC WELDING METHOD AND APPARATUS.
APPLICATION FILED JUNE 26, 1920.
1,416,450. Patented May 16, 1922.
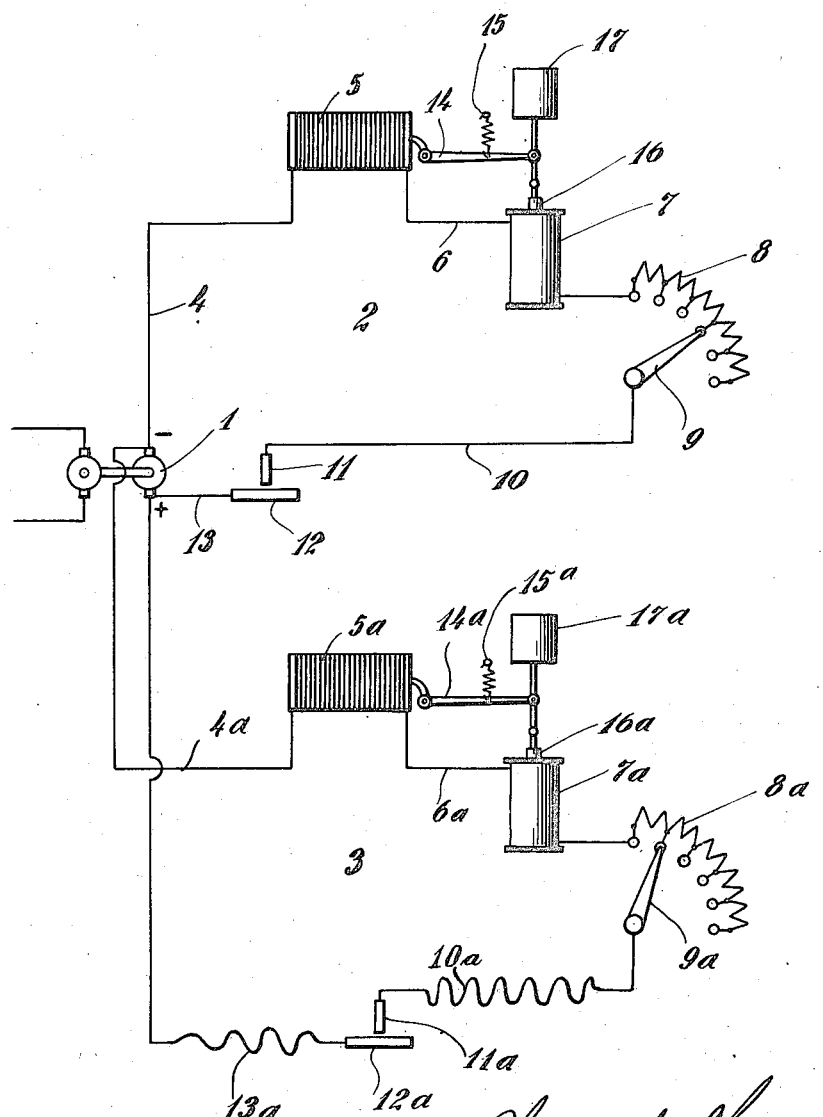

UNITED STATES PATENT OFFICE.

ALEXANDER CHURCHWARD, OF NEW YORK, N. Y., ASSIGNOR TO WILSON WELDER & METALS COMPANY, INC., A CORPORATION OF NEW YORK.

ELECTRIC-WELDING METHOD AND APPARATUS.

1,416,450.       Specification of Letters Patent.    Patented May 16, 1922.

Application filed June 26, 1920. Serial No. 391,900.

*To all whom it may concern:*

Be it known that I, ALEXANDER CHURCHWARD, a citizen of the United States, residing at New York city, county of New York, State of New York, have invented certain new and useful Improvements in Electric-Welding Methods and Apparatus, of which the following is a specification.

This invention relates to electric arc welding, and particularly to a system of welding having a plurality of arcs operated by a single generator, and wherein a uniform current is maintained in each arc by automatic compensating means.

One object of my invention is to improve the means of controlling the current in each circuit of such a system so as to prevent overheating and burning out of the automatic compensators. A further object is to provide controlling means of such a nature that the conductors or electrode leads in each circuit may be of any desired length.

My invention relates particularly to that type of electric welding known as "metallic arc welding" where the welding metal is supplied to the work by the electrode itself. In apparatus for this type of electric welding the variations in the current due to fluctuations in the arc, etc., may be compensated for, by utilizing in each circuit, a variable resistance which is automatically controlled by the strength of the current flowing in such a manner that the current in each individual circuit will be maintained constant thereby insuring an even deposit of metal by the arc. An apparatus of this type is described in the U. S. patent to D. H. Wilson, No. 1,187,408 granted June 13, 1916.

Heretofore a multiple arc system of this type has been subject to the disadvantage that it has been necessary to use conducting wires or leads for the electrodes of practically uniform lengths for all circuits. If an unusually long lead wire were employed in any particular circuit the reaction of the compensating resistance in that circuit (usually operated by a solenoid in series with the arc) would be so small that the most efficient and sensitive range of the variable resistance would be exceeded. Even if the range of the variable resistance were not entirely exceeded, the I. R. drop through the variable resistance would become so great as to cause overheating and rapid burning up of the resistor elements. Conversely, if an unusually short electrode lead were employed in any circuit, the action of the solenoid of that circuit would become too great, reducing the variable resistance to a minimum value below its most efficient range. Thus in operating machines of the type illustrated in the patent to Wilson above mentioned, where the voltage is generally kept comparatively low, (about 35 volts) it often happens that work is being done close to one panel, at the same time that welding is being done in a second circuit in another part of the shop, perhaps several hundred feet away from its panel. This necessitates a long lead wire containing an excessive amount of copper for the second circuit. Ordinarily when such a long lead were being employed, the voltage of the system would be raised at the busses which supply all the panels; but this would then cause too high a voltage for the first circuit having the short lead and would result in the overheating of the variable resistance or carbon pile of this circuit. Thus if the voltage was of the proper value for the panel with a short lead, then it was not possible to do good work with the panel having the excessively long lead. In fact, unless the ratio between the I. R. drop in the electrode lead wire and the I. R. drop in the solenoid of each circuit is maintained within certain limits the results will be detrimental. The accompanying drawing illustrates one of the various possible embodiments of my invention.

The single figure shown upon the drawing is a diagrammatic view of a two-arc system having my invention applied thereto.

Referring to the drawing, energy is supplied from the generator 1 to both of the welding circuits 2 and 3. The current in the circuit 2 may be traced as follows: from the generator 1, through the wire 4, through the automatically variable pressure controlled pile 5, through the wire 6, the solenoid 7, the control resistance 8, the contact lever 9, the wire 10, the welding electrode 11, the work 12 and the wire 13, to the opposite terminal of the generator 1. In this circuit the lead wires 10 and 13 are of normal length and the contact lever 9 is shown on the fourth step of the controlling resistance 8.

The circuit 3 takes current from the same generator 1 and is similar in most respects to the circuit 2. As shown on the drawing this circuit is provided with long electrode leads 10ª and 13ª and, consequently, an unusually large resistance is introduced into the welding circuit. For this reason the effective proportion of the control resistance 8ª inserted in the circuit must be smaller than the corresponding amount of the control resistance 8 inserted in the circuit 2. As will be noted, the contact lever 9ª of the circuit 3 is shown on the second step of the control resistance instead of on the fourth step as in the first circuit 2.

Each of the compensating piles 5 and 5ª is composed of a plurality of carbon resistor elements which are compressed at one end by the levers 14 and 14ª. The force exerted by these levers is dependent upon the difference in effective pull between the controlling solenoid plungers 16 and 16ª and the springs 15 and 15ª. The dash-pots 17 and 17ª are also preferably connected to the compressing levers to dampen excessive vibrations thereof.

One advantage of the present invention is that a single generator may supply any convenient number of welding panels and the electrodes may be located at any distance from the panel desired, using any length and size of lead. Another advantage secured by my invention is the great saving of copper owing to the fact that leads of any dimensions may be employed and that the use of leads longer than normal can have no deleterious effects. Furthermore, the variable resistance compensator used in such systems will be rendered more reliable and sensitive and its action will be more efficient and there will be less danger of overheating and burning out of the resistor elements.

Another obvious advantage is that I may employ automatic compensating resistances of considerably smaller range than has been heretofore possible in multiple arc systems.

The embodiment of my invention above described is illustrative of one form only and I desire it to be understood that my invention can be practiced in various other ways within the general scope of the following claims:

I claim:

1. In a welding system, in combination, welding circuits in multiple, electro responsive means in each of said circuits to automatically vary the resistance therein to compensate for variations in the current flowing through the arc, and other means in each of said circuits to maintain a constant operating normal resistance irrespective of the resistance of the electrode leads.

2. In a welding system, in combination, a plurality of welding circuits in multiple, and automatic means in each of said circuits to smoothly vary the resistance to compensate for the fluctuations of the arc, said means comprising a variable resistance, controlled by a series solenoid, and other means in each of said circuits in series with said automatic means to maintain a constant relation between the resistance of the electrode leads and the solenoids.

3. In an arc welding system, a source of current supply, a welding circuit comprising a pair of electrodes, a variable resistance automatically compensating for variations in the arc current, and a second variable resistance adapted to be manipulated to compensate for differences in the length of the electrode leads.

4. In an arc welding circuit, the combination with a pressure variable resistance, of means responsive to the current in said circuit for varying said resistance, and a rheostat in said circuit adapted to compensate for variations in resistance of the circuit due to changes in length of leads used.

5. In a multiple electric arc welding system, a source of current supply, a plurality of welding circuits connected to said current supply; each circuit including a stationary electrode and a movable electrode, a lead for said movable electrode, an automatic current controller, and a manually variable resistance in series with said controller and said electrodes, said resistance being adapted to be manipulated to maintain a predetermined current in said circuit irrespective of the length of said electrode lead.

6. In an arc welding circuit, the combination with a carbon pile rheostat, of means responsive to current in said circuit for varying the pressure on said rheostat, and an adjustable resistance in said circuit adapted to maintain the circuit exclusive of the carbon pile of constant resistance irrespective of the length of the leads used.

In testimony whereof, I have affixed my signature to this specification.

ALEXANDER CHURCHWARD.